United States Patent [19]

Vobach

[11] Patent Number: 5,335,280
[45] Date of Patent: Aug. 2, 1994

[54] RANDOM SUM CIPHER SYSTEM AND METHOD

[76] Inventor: Arnold R. Vobach, 11114 Ashcroft, Houston, Tex. 77096

[21] Appl. No.: 10,245

[22] Filed: Jan. 28, 1993

[51] Int. Cl.$^5$ ............................................. H04K 1/00
[52] U.S. Cl. ........................................ 380/42; 380/46; 380/28
[58] Field of Search ...................... 380/22, 28, 42, 46, 380/47

[56] References Cited

U.S. PATENT DOCUMENTS

| | | |
|---|---|---|
| 2,949,501 | 8/1960 | Hell . |
| 3,067,280 | 12/1962 | Schlafly, Jr. . |
| 3,911,216 | 10/1975 | Bartek et al. . |
| 4,193,131 | 3/1980 | Lennon et al. . |
| 4,202,051 | 5/1980 | Davida et al. . |
| 4,206,315 | 6/1980 | Matyas et al. . |
| 4,301,327 | 11/1981 | Lee et al. . |
| 4,326,098 | 4/1982 | Bouricius et al. . |
| 4,341,925 | 7/1982 | Doland . |
| 4,369,434 | 1/1983 | Mueller . |
| 4,418,275 | 11/1983 | Oosterbaan et al. . |
| 4,441,095 | 4/1984 | Widmer et al. . |
| 4,447,672 | 5/1984 | Nakamura ............... 380/42 |
| 4,638,120 | 1/1987 | Herve . |
| 4,667,301 | 5/1987 | Chiu et al. . |
| 4,751,733 | 6/1988 | Delayaye et al. ............ 380/42 |
| 4,776,011 | 10/1988 | Busby . |
| 4,791,669 | 12/1988 | Kage . |
| 4,853,962 | 8/1989 | Brockman . |
| 5,113,444 | 5/1992 | Vobach ..................... 380/47 |
| 5,193,115 | 3/1993 | Vobach ..................... 380/46 |

OTHER PUBLICATIONS

"An Introduction to TRIARCH 2000", Jul., 1989, Rich Inc., pp. 2-30, 76 Beaver St, 14th Floor, New York, N.Y. 10005.

"TRIARCH 2000 Trading Information Architecture", 5 pages, Date Unknown, Rich Inc., A Reuter Co.
"Trading Room Systems", Product Information Brochure, Rich Inc., A Reuter Co., 4 pages, Date Unknown.
"Trading Information Systems Requirements An Overview", J. Nadan et al. IEEE Comm. Sec., New York Section Seminar, Dec. 4, 1984, pp. 1-12.
Excerpt from Chapter 8 entitled "The one-time pad and linnear shift-register sequences" from *Codes and Cryptography*, Dominic Welsh.

*Primary Examiner*—Tod R. Swann
*Attorney, Agent, or Firm*—Gunn & Kuffner

[57] ABSTRACT

A cipher system for use by a sender and receiver provides a plaintext alphabet, each character of which is coded by a numerical synonym, the set of numerical synonyms comprising a collection of non-negative integers of common length and known to both sender and receiver. The system further provides a concatenation of the numerical synonyms comprising a plaintext message string integer corresponding to a plaintext message and a masking tape string integer comprising a randomly or pseudo-randomly accessed sequence of digits extracted from a string of digits accessible to both sender and receiver and added to the plaintext message string to form a ciphertext string. The numerical synonyms of plaintext alphabet characters may be permuted, relative to the normal listing of the alphabet, from message to message according to prior secret arrangement of sender and receiver. Also, the ciphertext string may be adulterated by prefixing, suffixing, or inserting integers of possibly variable length generated by a number generator, according to secret prior arrangement between sender and receiver. Still further, the ciphertext string may be subjected to permutations of blocks of its (adulterated) digits, according to secret prior arrangement between sender and receiver.

16 Claims, 4 Drawing Sheets

RANDOM SUM CIPHER SYSTEM AND METHOD

FIELD OF THE INVENTION

The present invention relates generally to computing systems and methods. More particularly, the present invention relates to a cipher system and method for encrypting and decrypting computer data.

BACKGROUND OF THE INVENTION

A common method of encrypting a plaintext message starts by substituting integers for plaintext characters according to some standard alphabet such as ITA2, ITA5, ASCII, or EBCDIC. These integers are then written in binary form to create a first string, or sequence, of 0's and 1's. The first string is modulo 2-added to another, second sequence of 0's and 1's to produce a third sequence of 0's and 1's. The third sequence of 0's and 1's is transmitted as the encrypted message. The sender's object is to make this third string of 0's and 1's appear to be a random sequence of digits in binary form. The intended receiver modulo 2-adds the second sequence to the third sequence to recover the first sequence. Thereafter, the original plaintext message is derived from the standard alphabet that was used, e.g., ITA2, ITA5, ASCII, or EBCDIC. If the second sequence is truly random, an interceptor-attacker will be unable to reproduce the first sequence. Thus, the plaintext message is preserved.

There are a number of problems with this scheme: First, random number strings are a relatively scarce commodity. Second, the receiver must have at hand exactly the same random number sequence the sender used or must be able to reproduce it. Having at hand exactly the same random number sequence the sender used requires the sharing of an enormous amount of key material. The sharing of an enormous amount of key material is impractical. Reproducing exactly the same random number sequence the sender used is impossible.

To avoid these two difficulties, a pseudo-random number generator is commonly employed by both sender and receiver. A pseudo-random number generator is a deterministic machine which, when initialized by a "seed" number, produces a string of digits which appears to be random (by passing various statistical tests). The output of a pseudo-random number generator is periodic, but the period can be made very long. When sender and receiver use pseudo-random number generators to produce the second, key, or encrypting sequence, they start with a common initializing "seed" and synchronize the outputs of their generators. Starting with a common initializing "seed" and synchronizing the outputs of the generators allows a known plaintext attack in which an interceptor-attacker gains access to plaintext (hence to its binary digit string equivalent in terms of some standard numerical alphabet) and to the corresponding ciphertext. Knowing the digits of the binary plaintext string enables the attacker to reproduce the corresponding pseudo-random number sequence. This frequently allows the attacker to determine the algorithm, initializing "seed," and output sequence of the system's pseudo-random number generator, thus "breaking" the code.

In U.S. Pat. No. 5,113,444, entitled "Random Choice Cipher System and Method," issued to the same inventor as that of the present invention and incorporated herein by reference (which may be referred to as the random choice system or the random choice method), a string of random digits is added to a string of integers numerically coding the plaintext characters of a message. The summed integer is the body of the cryptogram.

The numerical codings, referred to as numerical synonyms, are randomly chosen from large, randomly dispersed collections of such integers corresponding to the plaintext alphabet characters. The collections of randomly distributed numerical synonyms and their matchings to the characters of a plaintext alphabet comprise a thesaurus which must be shared by a sender-receiver pair. A masking tape must also be shared between sender and receiver. A masking tape comprises a long string of random digits from which the string of random digits, to be added to the numerical coding of the message, is selected.

Another cipher scheme, by the same inventor as that of the present invention, teaches a "Random Coding Cipher System and Method," copending U.S. patent application Ser. No. 07/953,521, incorporated herein by reference and may be referred to herein as the random coding system or the random coding method. This scheme dispenses with the thesaurus, using instead one-time numerical codings for alphabet characters which are themselves extracted from the masking tape. The plaintext message string formed with these numerical codings is then added to a string of digits from the masking tape to form the ciphertext string.

Like this random coding cipher system, the present invention utilizes only a long shared masking tape, but, unlike the random coding cipher system, it does not change numerical codings of plaintext alphabet characters with each message.

The present invention thus provides a variant of the famous "one-time pad" system of Vernam. In the Vernam system, sender and receiver share an alphabet, A, the set of characters of which has cardinality $|A|$, and positive integer codings, also $1, \ldots, |A|$, for each of the alphabet characters. Sender and receiver also share a long string, S, of randomly recurring integers, $1, \ldots, |A|$.

To send a first message, the sender adds, modulo $|A|$, the first integer from S and the numerical coding of the first plaintext character of this first message. Likewise, for the next integer for transmission, the sender adds, modulo $|A|$, the second integer of S and the numerical coding of the second character of the message, etc. The resultant concatenated string of sums, representing random replacements of alphabet characters by others, constitutes the cryptogram. The receiver subtracts the corresponding sequence of integers from S to recover the agreed-upon numerical coding of the original message. The string of integers from S for the second message starts where that of the first message left off, etc. Hence the name of the method (one-time pad)—as key material from S is used, it is discarded. Attempts to avoid frequent exchanges of strings S have heretofore involved substituting synchronized pairs of pseudo-random number generators for the integer strings S, as remarked above.

The present invention differs from the one-time pad in major ways: First, the shared integer string (herein called the masking tape) can be used indefinitely since the location of the masking tape string integer is arbitrary and concealed from an attacker.

Second, the numerical codings of plaintext characters are effectively changed, from the viewpoint of an attacker, whenever spurious digits are interspersed in the ciphertext string. Third, like its predecessors, the random choice system and the random coding system, the present invention provides for block permutations of segments of the ciphertext string.

These distinctions will be made more apparent in the detailed description of the invention given below.

SUMMARY OF THE INVENTION

In a random sum cipher system of the present invention, a sender and receiver pair share a long string of random digits, referred to herein as the masking tape. To encrypt a plaintext message, the sender generates a random number (with a random number generator, RNG) or a pseudo-random number (with a pseudo-random number generator, PRNG). (Hereafter, the term "number generator" refers to either a RNG or a PRNG.) This integer is referred to herein as the initializing integer. The sender selects a second integer as a function of the initializing integer. This second integer is the starting integer for the message. The method of formation of the starting integer from the initializing integer is secretly shared by sender and receiver and may be changed from time to time.

The characters of a plaintext alphabet used to transmit messages between sender and receiver are coded by non-negative integers of a common length. These non-negative integers of common length are the numerical synonyms of the plaintext alphabet characters. These are shared by sender and receiver and are not changed from message to message. The concatenation of numerical synonyms corresponding to the successive plaintext characters of a particular message constitutes the plaintext message string integer for that message.

The masking tape string integer, of length equal to that of the plaintext message string integer, is the string of consecutive digits in the masking tape commencing at the starting integer position. The masking tape loops back to its beginning if exhausted during the encryption of a message. The masking tape string integer is added to the right, with "carries" to the fight, to the plaintext message string integer to form the ciphertext string integer. The ciphertext string, prefixed by the initializing integer, is sent off as the cryptogram.

To decrypt a message, the receiver extracts the starting integer from the initializing integer and looks into the masking tape, beginning at the position indicated by the starting integer, to determine the masking tape string. The masking tape string is then subtracted (to the fight) from—i.e., peeled off—the ciphertext string to reveal the plaintext message string which is then converted into the plaintext message. Since the plaintext message string (without interspersions) will be of length equal to the common length of the numerical synonyms times the number of message characters, or at most one digit greater, the length of the masking tape string is readily determined.

As long as the masking tape string is truly random, the ciphertext string integer will also be random, and the system of the present invention, like the random choice system and the random coding system, retains the property of perfect secrecy.

As with the random choice and random coding methods, the ciphertext string may be adulterated by prefixing, suffixing, or interspersing random or pseudo-random integers of variable length. It may also be subjected to block permutations of its digits.

If the scheme just described were to use successive strings of digits from the masking tape, starting from the beginning, as masking tape string integers, it would merely be the one-time pad. Computer memory (as provided by CD ROM devices, for example) is cheap and getting cheaper. Still, throwing away a masking tape when it has been exhausted, generating a new string of random digits and exchanging it with potential receivers is unnecessarily expensive and inconvenient.

The present invention permits the continued use of the masking tape by arbitrarily selecting masking tape strings from it. Moreover, if the masking tape were to fall into the hands of an attacker, it would be much more difficult for the attacker to determine the location of a given masking tape string than if masking tape strings were simply extracted serially from the masking tape. This is especially so if the attacker happened to know all (and the length of) prior message traffic using this masking tape.

Indeed, suppose that an attacker has access not only to the masking tape, but also to a particular message's starting integer. Insertion of an extraneous integer in the ciphertext, if undetected by the attacker, has the effect, as successive masking tape digits are subtracted from the body of the cryptogram, of altering the remaining string of numerical synonyms seen by the attacker. In this sense, the secret, undetected occurrence of an inserted integer "offsets" the masking tape and randomizes the subsequent numerical codings of plaintext alphabet characters as perceived by the attacker. The perceived numerical codings of each plaintext character will generally be different for each successive occurrence of that character in the remainder of the message.

For example, suppose the letter "C" is coded by "03."Suppose that in a particular message, a random integer has been interposed in the ciphertext string. Sender and receiver, recognizing the interruption, might add, respectively, "14" and "56" for the next two plaintext occurrences of "C," giving (assuming no carries), "17" and "59," respectively. An attacker, reading out the masking tape "across" the interspersion, might instead use "09" and "43," respectively. Upon subtraction this would code "C" by first "08" and then by "16." It thus becomes impossible to locate further occurrences of "C" by frequency analysis, even given the masking tape and the starting position of the masking tape string.

This added impediment to attack further distinguishes the present method from that of the one-time pad.

Permutation of digit blocks of a cryptogram according to prior arrangement between sender and receiver further distinguishes the present invention from the system of the one-time pad.

An advantage of the present invention over that of the random coding cipher system and method is that no encryption or decryption time is lost determining numerical synonyms for plaintext characters; the numerical coding of the alphabet stays the same. Inserting spurious integers in the body of the cryptogram of course increases its length, but such insertions are desirable options for the two previous methods as well.

Since numbers are ordinarily stored in computer memories, in binary notation, as strings of O's and I's, the starting integer position for readout of the masking tape string can be more generally interpreted as the starting bit position for forming the successive integers of the masking tape string. This effectively multiplies (by the number of bits per digit) the number of searches an attacker must conduct to discover the masking tape string (given that the attacker possesses the masking tape). For clarity of description of the system and method, but not for limiting the scope of the invention, the phrase "starting integer position" will continue to be used throughout.

A similar comment can obviously be made relative to the two previous inventions, "Random Choice Cipher System and Method" and "Random Coding Cipher System and Method," which have been mentioned in connection with the present invention.

Common current technology permits the transmission of voice or sound communications in digitized form. Thus, the present invention provides a quick and secure means of encrypting such transmissions.

DETAILED DESCRIPTION OF PREFERRED EMBODIMENTS

Figure 1:
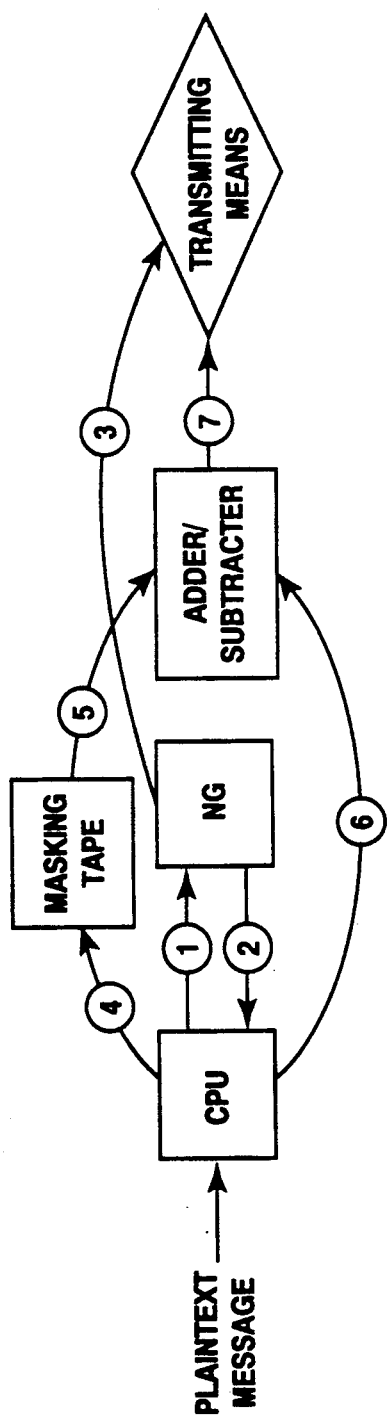
FIG. 1 is a flow chart illustrating the encryption of a plaintext message by a preferred embodiment of the invention.

Referring to FIG. 1, upon receipt of the first character of a plaintext message, the central processing unit (CPU) instructs the RNG or PRNG, generically a number generator (NG), by link 1, to produce a random (pseudo-random) initializing integer which the NG returns to the CPU by link 2 and sends to the transmitting means by link 3.

The CPU calculates the starting integer from the initializing integer and sends it to the masking tape by link 4. The masking tape uses the starting integer to index the beginning of the masking tape string which is transmitted to the adder/subtracter by link 5.

The CPU converts the incoming plaintext message characters to their numerical synonyms using the numerical codings agreed upon by sender and receiver and sends the resulting plaintext message string to the adder/subtracter by link 6.

In the adder/subtracter, the plaintext message string and the masking tape string are added to the right, with carries to the right, and their sum, the body of the cryptogram, is sent by link 7 to the transmitting means where it falls in behind the initializing integer for transmission to the intended receiver.

Figure 2:
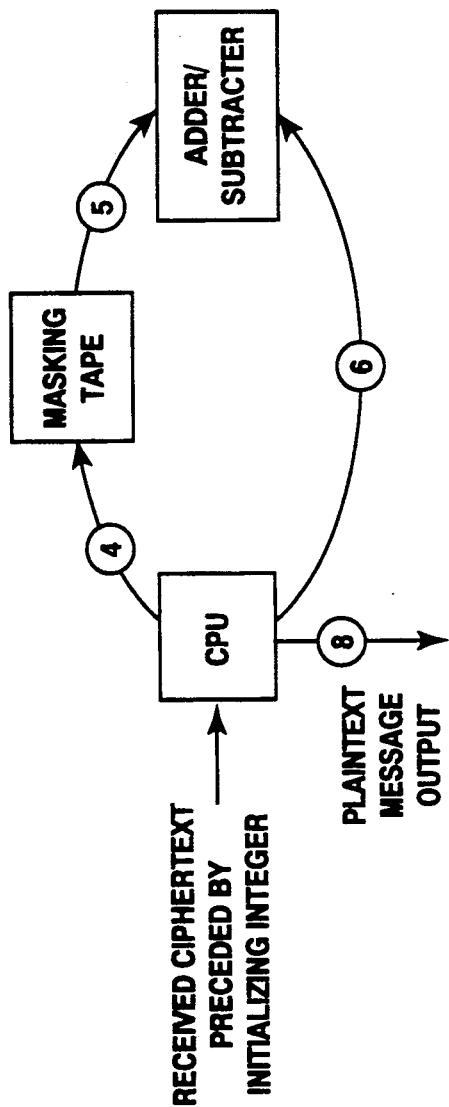
FIG. 2 is a flow chart illustrating the decryption of a received cryptogram by an apparatus similar to that of FIG. 1.

Referring to FIG. 2, upon receipt of a cryptogram, the CPU extracts the starting integer from the initializing integer and transmits it to the masking tape by link 4. The masking tape uses the starting integer to index the beginning of the masking tape string which is transmitted to the adder/subtracter by link 5.

In the adder/subtracter, the masking tape string is subtracted to the right, with carries from the right, and the resultant plaintext message string is returned, via link 6, to the CPU, where it is converted to the plaintext message and output by link 8.

Figure 3:
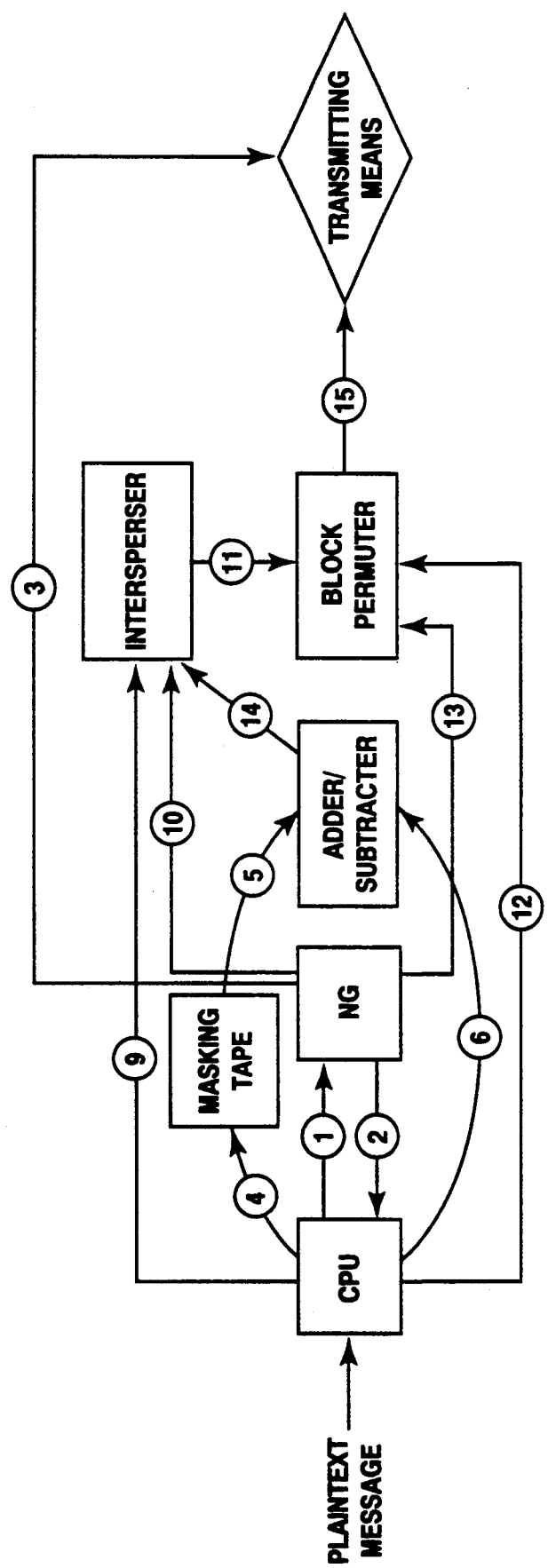
FIG. 3 is a flow chart illustrating the encryption of a plaintext message by another preferred embodiment of the invention, further involving interspersions and block permutations.

FIG. 3 is a flow chart for another preferred embodiment in which the basic process of FIGS. 1 and 2 is enhanced by means for interspersing spurious integers and permuting blocks of ciphertext digits.

Upon receipt of the first plaintext character of a message, the CPU instructs the NG, by link 1, to create an initializing integer which it transmits back to the CPU by link 2. The NG also sends the initializing integer, by link 3, to the transmitting means where it will form the first part of the cryptogram.

The CPU calculates the message's starting integer from the initializing integer and sends the starting integer, via link 4, to the masking tape. Beginning at the position indexed by the starting integer, the masking tape reads out the masking tape integer and sends it, by link 5, to the adder/subtracter.

The CPU converts the plaintext message into the plaintext message string using the numerical codings of alphabet characters agreed upon by sender and receiver. The plaintext message string is then sent, by link 6, to the adder/subtracter where it is added to the right, as before, to the masking tape string.

The adder/subtracter delivers, by link 14, the unadulterated ciphertext string to the intersperser, where, upon instructions from the CPU, by link 9, it inserts spurious random or pseudo-random integers from the NG which are delivered by link 10. These inserted integers are called out of the NG by the CPU using link 1.

The adulterated (by prefixes, suffixes, and interspersions) ciphertext string goes from the intersperser to the block permuter by link 11. The block permuter, acting on instructions from the CPU, brought by link 12, permutes blocks of digits of the ciphertext string, filling out the last block if necessary by an integer delivered from the NG by means of link 13. The NG is instructed to provide these makeup digits by the CPU using link 1.

Finally, the finished body of the cryptogram goes by link 15 to the transmitting means where it follows the initializing integer in transmission.

Figure 4:
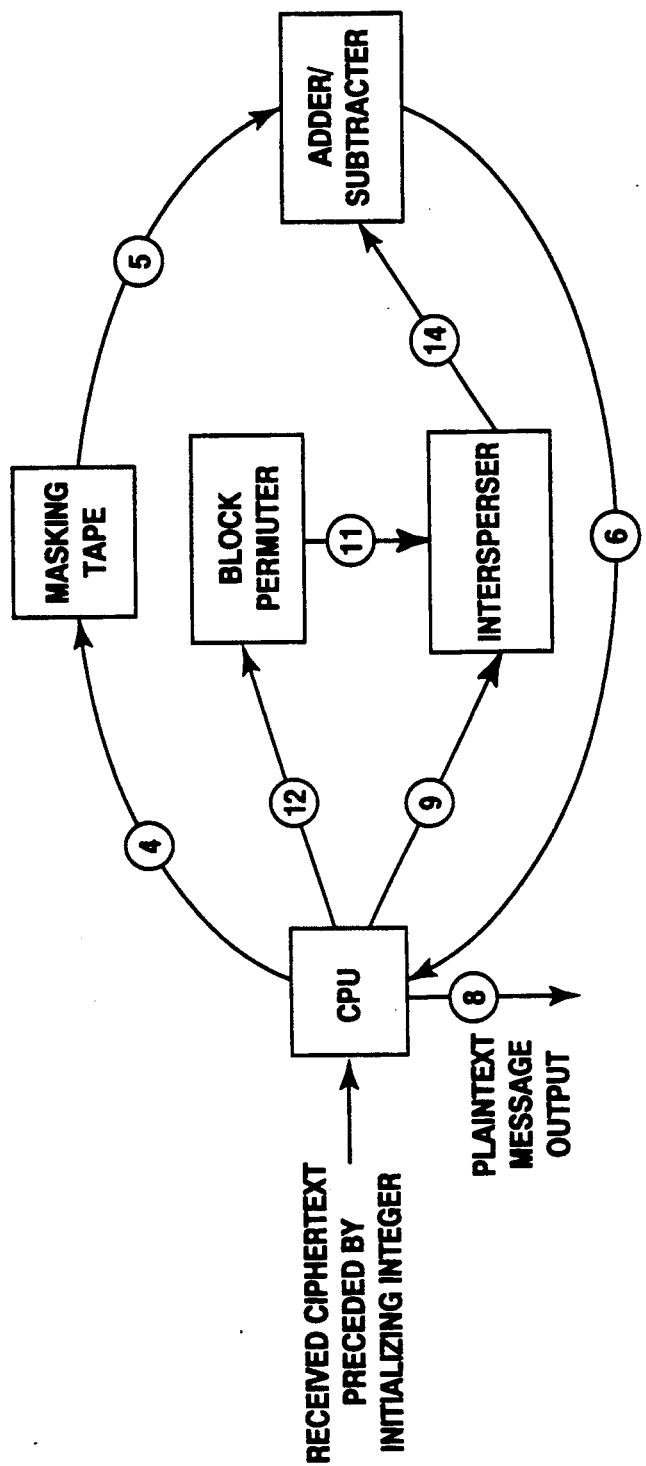
FIG. 4 is a flow chart illustrating the decryption of a received message by an apparatus similar to that of FIG. 3.

FIG. 4 refers to an apparatus similar to that of FIG. 3, used now for decryption. Upon receipt of a cryptogram, the CPU extracts the starting integer and sends it, by link 4, to the masking tape, to initiate the readout of the masking tape string.

The CPU sends the ciphertext string and instructions for undoing digit block permutations, by link 12, to the block permuter. The unpermuted but still adulterated ciphertext string is sent by link 11 to the intersperser.

The intersperser, acting on instructions received by link 9 from the CPU, strips out interspersed spurious integers from the ciphertext and sends the now unpermuted, unadulterated ciphertext, by link 14, to the adder/subtracter.

The adder/subtracter, using the masking tape string supplied via link 5, recovers the plaintext message string and sends it, by link 6, back to the CPU.

The CPU converts the numerical codings of the plaintext message string into the corresponding plaintext message characters, dropping off any remaining digits added to permit the last block permutation of the ciphertext string. The plaintext message is now sent out, via link 8, to, e.g., a printer.

The principles, preferred embodiments, and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

I claim:

1. A cipher system for use by a sender and receiver, comprising:
   a. a source of plaintext alphabet characters, each character of which is coded by a numerical synonym, the set of numerical synonyms comprising a collection of non-negative integers of common length and known to both sender and receiver;
   b. a central processing unit, coupled to the source of characters, for developing a concatenation of the numerical synonyms comprising a plaintext message string integer corresponding to a plaintext message; and
   c. a masking tape memory coupled to the central processing unit to store a masking tape string integer, accessed by a randomly or pseudo-randomly selected starting position integer, and extracted from a string of digits accessible to both sender and receiver, and added to the plaintext message string to form a ciphertext string, the masking tape string integer differing only from one message to another as determined by the location of a starting position integer.

2. The system of claim 1, wherein the starting position integer for extraction of the masking tape string from the shared string of digits is transmitted with the cryptogram.

3. The method of claim 2, wherein the starting position integer is concealed in an initializing integer transmitted with the cryptogram.

4. The system of claim 3, wherein the initializing integer is generated by a number generator.

5. The system of claim 1, wherein the starting position integer for extraction of the masking tape string is transmitted concealed in a prior cryptogram.

6. The system of claim 1, wherein the numerical synonyms of plaintext alphabet characters are permuted, relative to the normal listing of the alphabet and associated numerical synonyms, from message to message according to prior secret arrangement of sender and receiver.

7. The system of claim 1, wherein the ciphertext string is adulterated by prefixing, suffixing, or inserting integers of possibly variable length generated by a number generator, according to secret prior arrangement between sender and receiver.

8. The system of claim 1, wherein the ciphertext string is subjected to block permutations of its digits, according to secret prior arrangement between sender and receiver.

9. A cryptographic method, comprising the steps of:
   a. generating a plaintext alphabet from a source of plaintext alphabet characters, each character of which is coded by a numerical synonym, the set of numerical synonyms comprising a collection of non-negative integers of common length and known to both sender and receiver;
   b. concatenating the numerical synonyms in a central processing unit, comprising a plaintext message; string integer corresponding to a plaintext message; and
   c. forming a masking tape string integer in a masking tape memory, accessed by a randomly or pseudo-randomly selected starting position integer, and extracted from a string of digits accessible to both sender and receiver, and adding this masking tape string integer to the plaintext message integer to form a ciphertext string, the masking tape string integer differing only from one message to another as determined by the location of a starting position integer.

10. The method of claim 9, wherein the starting position integer for extraction of the masking tape string from the shared string of digits is transmitted with the cryptogram.

11. The method of claim 10, wherein the starting position integer is concealed in an initializing integer transmitted with the cryptogram.

12. The method of claim 11, wherein the initializing integer is generated by a number generator.

13. The method of claim 9, wherein the starting position integer for extraction of the masking tape string is transmitted concealed in a prior cryptogram.

14. The method of claim 9, wherein the numerical synonyms of plaintext alphabet characters are permuted, relative to the normal listing of the alphabet and associated numerical synonyms, from message to mesage according to prior secret arrangement of sender and receiver.

15. The method of claim 9, wherein the ciphertext string is adulterated by prefixing, suffixing, or inserting integers of possibly variable length generated by a number generator, according to secret prior arrangement between sender and receiver.

16. The method of claim 9, wherein the ciphertext string is subjected to block permutations of its digits, according to secret prior arrangement between sender and receiver.

* * * * *